Patented June 16, 1925.

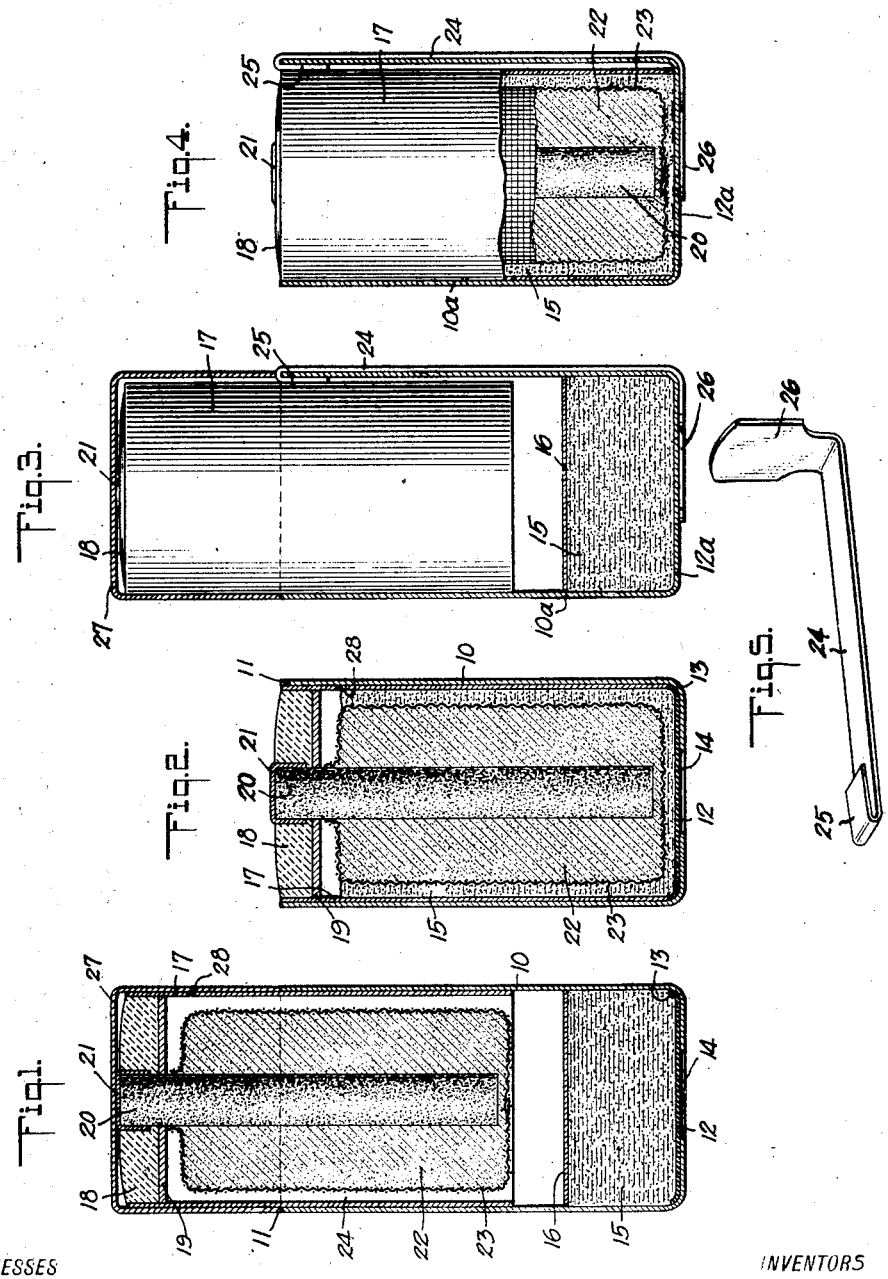

1,542,705

UNITED STATES PATENT OFFICE.

HARRY M. KORETZKY AND BORIS H. TEITELBAUM, OF BROOKLYN, NEW YORK; SAID TEITELBAUM ASSIGNOR TO SAID HARRY M. KORETZKY AND ISRAEL KORETZKY, OF NEW YORK, N. Y.

DRY-CELL BATTERY.

Application filed December 17, 1919. Serial No. 345,642.

*To all whom it may concern:*

Be it known that we, HARRY M. KORETZKY and BORIS H. TEITELBAUM, citizens of the United States, and resident of the city of New York, borough of Brooklyn, in the county of Kings and State of New York, have invented a new and Improved Dry-Cell Battery, of which the following is a full, clear, and exact description.

This invention relates to dry cell batteries such as are commonly used in connection with flashlights or the like and has particular reference to structural details calculated for the preservation of the electrical agents for an indefinite length of time during storage, transportation, or periods of inactivity.

More specifically stated one of the primary objects of the invention is to provide a dry cell battery in which the electrolyte is in the form of a paste carried in a receptacle in spaced relation to the depolarizing core until the cell or battery is to be put into active use.

Another object of the invention is to provide separate receptacles or compartments telescopically related to each other, one of the compartments carrying the electrolyte and the other carrying the depolarizing core, the active agents being brought into operative communication by the simple act of forcing one of said telescopic members into the other.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a vertical sectional view of one form of our improvement indicating the relative positions of the parts when in idle or storage condition.

Fig. 2 is a similar view of the same with the parts assembled for use.

Fig. 3 is a vertical sectional view of a modified form of the invention, the parts being in the same relative positions as the modification of Fig. 1.

Fig. 4 is a view of the same with the parts in assembled position.

Fig. 5 is a detail view of a contact strip to be described below.

Referring now more specifically to Figs. 1 and 2 I show a cup 10 made of paraffined paper or some equivalent fibrous material, the same having an open upper end 11 and a bottom closure 12 of zinc or its equivalent having an upturned periphery 13. The fibrous structure of the container 10 extends partly across the bottom 12, but there is observed a clearance at 14 for the purpose of making contact between the outer or bottom surface of the zinc bottom and another battery element.

Within the bottom portion of the container 10 is a supply 15 of any suitable electrolytic paste of a nature corresponding to a solution of salammoniac and chloride of zinc or its equivalent, but having a jelly-like consistency. This electrolyte is retained in the position indicated in Fig. 1 and sealed from contact with the atmosphere by a sealing washer saturated with paraffin 16 which has firmness sufficient to hold the electrolyte in the form and position indicated in Fig. 1.

The other container comprises a tubular member 17 of a size and form adapting it for slidable fit in the inner surface of the container 10. The container 17 consists of a shell of zinc, or its equivalent, the same being filled at its upper or outer end with a bituminous sealing member 18 adjacent to which is a washer 19 of paper, or its equivalent. These two members 18 and 19 serve to hold the outer end of a carbon stick 20 which projects beyond the bituminous sealing member where it is fitted with a brass cap 21 or contact piece. Said carbon stick projects inward centrally of the container 17 and has fitted thereto a suitable depolarizing core 22 of any suitable materials adapted for chemical cooperation with the electrolyte 15. Said depolarizing core is preferably wrapped with a fabric coating 23. Between the core 22 and the wall of the container 17 is observed a space 24.

With the parts as indicated in Fig. 1 there is no chemical action and hence no deterioration of the elements of the battery from any reason. In other words the device as shown may be kept in stock or on the shelf for any length of time without deterioration, but when the member 17 is forced directly into the container 10 as shown in Fig. 2 the depolarizing core is brought into direct contact with the electrolyte, the sealing coating 16 being ruptured by such assemblage of parts and whereby the electrolyte is caused to be forced up into the space 24, the lower edge of the zinc 17 comes into contact with the upturned periphery 13 of the bottom plate 12 and so establishes direct metallic connection between said bottom plate and the zinc portion of the inner container.

In the form of Figs. 3, 4 and 5 the container 10ª is substantially the same as the container 10 above described in so far as the electrolyte 15 and coating 16 are concerned. The bottom 12ª however is of fibrous material the same as the main portion of the container. The member 22 is or may be exactly the same as above described.

Fig. 5 indicates a metallic contact strip having a hook 25 at one end engageable over the open end portion of the container 10ª so as to have direct contact with the metallic tubing of the member 22 while a contact end portion 26 at the bottom end of the strip 24 lies against the bottom of the container 10ª in position to be engaged by an adjacent battery element arranged therewith in series.

It being remembered that the two cups or containers 10 and 17 are intended to be packed or carried in partially telescoped position or in such position that they are essentially assembled but without electrical action, it is desirable to employ in connection with the device a means to prevent accidental contact between the two active agents 15 and 22 until the desired time for putting the battery into action. To this end we employ a cheap discardable cap 27 which is fitted removably upon the outer end of the member 17 or against the cap 21, the inner end of the cap abutting directly against the inner end of the container 10. This cap 27 therefore serves not only as a sealing and finishing member for the battery in idle form but as a means to prevent the full telescoping action because a force applied to the outer end of the member 17 at such time would be resisted by the cap 27 and prevent contact between the two electrical agents.

To facilitate the telescoping of the parts a small pinhole 28 may be provided near the outer end of the member 17 through which the air in the interior may easily escape. This hole may be sealed subsequently by any suitable means or the electrolyte 15 may constitute a seal when exposed to the air.

The two main parts of the battery and during the intermediate or preliminary stages, or prior to assemblage for use, instead of being partially telescoped as shown in Figs. 1 and 3 may be kept detached from each other each with suitable caps or closures to protect the same. Since the batteries are made to fit standard casings such as flashlight casings, space is conserved by incorporating the contact strip 24 within the exterior surface of the cells 10 or 10ª, but for practical purposes the contact strip may be formed either within or on the outside of said outer containers.

We claim:

1. In a dry cell battery, the combination of an outer container of cellular material, an electrolyte carried within the bottom portion of this container, a coating of frangible material holding the electrolyte in place as aforesaid and preserved from deterioration during the inactive period of the battery, a second container telescopic within the first mentioned container and carried normally within the outer end thereof spaced from the electrolyte, said second container being of a metallic nature, a depolarizing member carried within the metallic container and spaced from the wall thereof, the electrolyte aforesaid being forceable into the space between the depolarizing member and the metallic container when the two containers are telescoped fully one within the other, and means to establish metallic connection between the second mentioned container and the bottom portion of the first mentioned container.

2. In a dry cell battery, the combination of a container of inert material, a mass of electrolyte carried in the bottom of this container, a second container of metal, a carbon stick secured in one end of the latter container and having at its outer end a contact cap while the main portion of the stick projects inward, a depolarizing member carried by the stick on the inside of the second mentioned container and spaced therefrom, the depolarizing member being normally spaced from the electrolyte prior to the initiation of the electrical action thereof, and means co-operating with the two containers to prevent premature telescoping thereof.

HARRY M. KORETZKY.
BORIS H. TEITELBAUM.